Patented June 22, 1926.

1,590,100

UNITED STATES PATENT OFFICE.

MIKE KULICKY, OF KENOSHA, WISCONSIN.

HAIR TONIC.

No Drawing.  Application filed March 24, 1925.  Serial No. 18,059.

This invention is directed to an improvement in hair tonics made up of certain ingredients which are beneficial in promoting the growth of human hair, and in maintaining the same in soft and strong texture.

The composition, which is in the form of a paste, is made up of the tri-out of salty bacon, pure lard, grain alcohol, powdered lilac blossoms, and a suitable perfume.

The salty bacon is subjected to the action of heat and the melted portion is mixed with pure lard in the proportion of twelve ounces of the bacon product to ten ounces of pure lard. Three ounces of grain alcohol are then added, together with four ounces of lilac blossoms in powdered form. Any requisite proportion, say one ounce, of selected perfume, may then be added.

The melted bacon product is for the purpose of opening and maintaining in open position the pores of the scalp from which the hair has fallen, due primarily to failure of proper food for the hair roots. The pure lard acts as a vehicle to assist the bacon product in penetrating the scalp, and furthermore assists, through its adhesive property, in keeping the bacon product and other ingredients in close relation to the scalp. The pure lard is further useful in keeping the scalp and hair in more or less softened condition. Grain alcohol is added for its well known cleansing properties and to avoid deterioration of the other ingredients. The lilac blossom powder is of direct value, preventing dryness of the scalp and maintaining the hair soft and fluffy and preventing brittleness of the hair. The perfume is merely added for the purpose of imparting an agreeable odor to the tonic.

What I claim is:

A hair tonic consisting of the following ingredients substantially in the proportions named; twelve ounces of the melted product of salty bacon, ten ounces of pure lard, three ounces of grain alcohol, four ounces of powdered lilac blossoms, and one ounce of perfume.

In testimony whereof I affix my signature.

MIKE KULICKY. [L. S.]